United States Patent Office 2,857,287
Patented Oct. 21, 1958

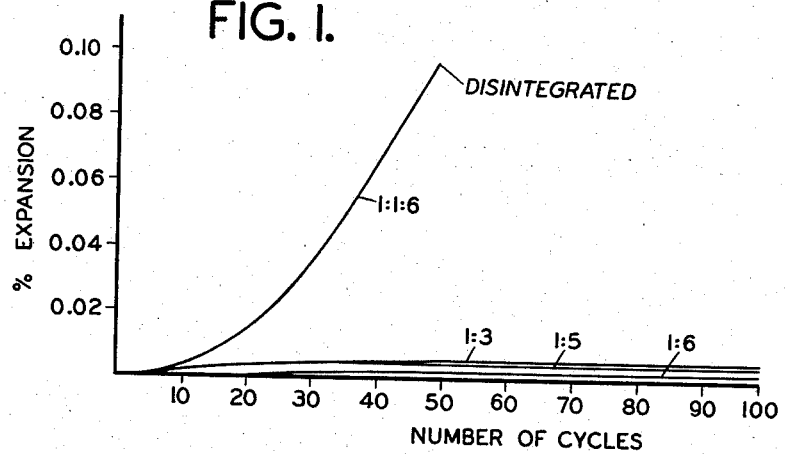
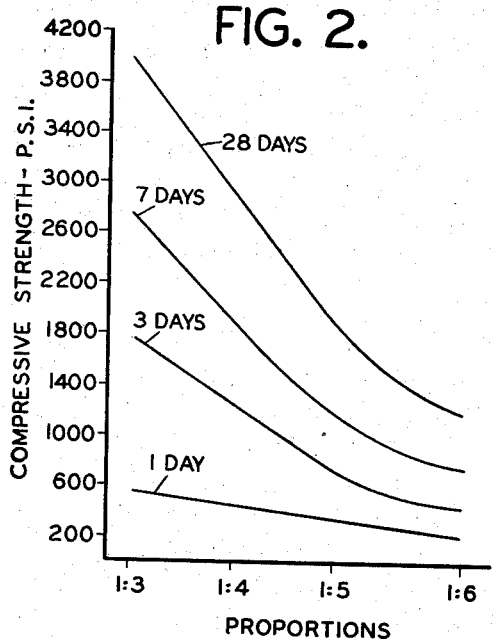
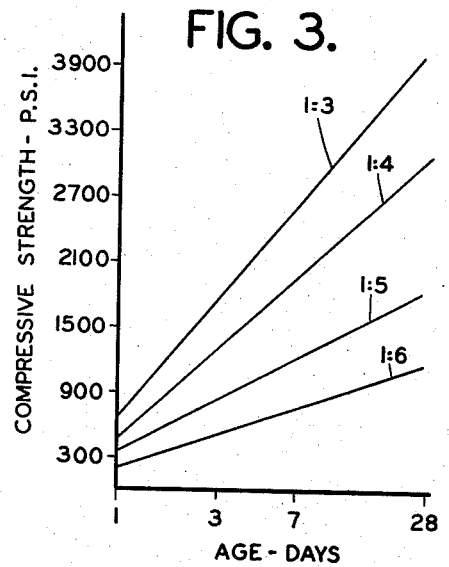

2,857,287

MORTAR AND LIGHT-WEIGHT CONCRETE COMPOSITION

Leo Kampf, Sunnyside, N. Y.

Application December 30, 1954, Serial No. 478,670

12 Claims. (Cl. 106—109)

This invention relates to a mortar and light-weight concrete composition.

The objects of this invention are coextensive with its relative advantages over conventional mortar and light-weight concrete and consequently a discussion of one is a discussion of both. The invention relates in the main to mortar but it is equally applicable to the field of light-weight concrete.

Speaking generally, the mortar herein provided is made without lime and an additive is substituted which not only performs the function of lime but also other functions as well. Also speaking generally, the light-weight concrete herein provided is light in weight not because of the use of light-weight aggregate but rather because of its relatively large air volume.

The objects of this invention will be mentioned briefly here and will be discussed in considerable detail in the body of the specification. Speaking broadly, one object of the invention is the provision of a mortar whose workability is far superior to that of conventional mortars. Workability is a feature which involves a number of different facets and aspects and it will hereinafter be seen that the mortar herein provided is superior to known mortars in these various facets or aspects.

Another object of this invention is the provision of a mortar which possesses great dimensional stability and this feature too is built up of a number of factors in which the mortar herein claimed is superior to known mortars. This aspect of the invention applies equally well to its application to light-weight concrete.

Still another object of this invention is the provision of a mortar which has good water retention, a good bond and low permeability.

A still further object of this invention is the provision of a mortar which possesses great structural strength and here, too, the invention applies with equal force to lightweight concrete.

It is still another object of this invention to provide a mortar which can be used, without change in its mix or proportions, as a lightweight concrete, for example, for flooring, roofing, partitions, insulation and lightweight masonry units in the category of cinder blocks and the like.

Some of the features of the present invention are illustrated in the accompanying drawing in which:

Fig. 1 is a graph showing comparative expansion tests with various mortars, including conventional mortars and the mortar herein claimed, due to alternate freezing and thawing.

Fig. 2 is another graph showing the compressive strength of the mortar herein claimed at various ages and in various proportions.

Fig. 3 is still another graph showing the compressive strength of the mortar herein claimed, also at various ages and in various proportions.

The present invention involves, in essence, the use of an additive capable of incorporating into mortar and concrete mixes the properties and features above outlined. This additive may take various forms and involve various proportions, depending upon the property or characteristic which a particular installation or construction would most require. Thus, while the present additive may be incorporated both in mortars and light-weight concretes, certain characteristics will be found desirable in the one and not in the other and vice versa and consequently variations in the additive would be required. These variations may be catalogued in two categories. In the first place, there may be variations in the substances which comprise the additive in the sense that certain substances may be added or omitted. In the second place, the additive may vary in the proportions of the several substances which comprise it. It is of course also true that there may be variations in both senses at the same time, that is, the additive may be varied both as to its component substances and as to their respective proportions.

The most important ingredient in the additive herein disclosed and claimed is methyl cellulose. This is a white, granular, flaky, water-soluble material which is a strong emulsifying agent. When it is dissolved in cold water (2% solution) the viscosity of the solution ranges from a low of 15 to a high of 4000 centipoises. For the purposes of the present invention, only highly viscous grades of methyl cellulose may be used, namely, of the order of 4,000 centipoises in a 2% solution, and 4,000 centipoises is preferred.

The concentration of methyl cellulose in the additive herein claimed depends upon the various characteristics or properties desired. For example, .25% of methyl cellulose will result in 90% water retention but it is the combination of methyl cellulose and air that produces the best water retention; neither alone will suffice. The best concentration, however, is .15% of methyl cellulose since this gives a water retention of 82% which is fully adequate for ordinary purposes.

It is to be noted that the above percentages relate to the proportion of the methyl cellulose to the cement in the cement mix. The range is from .05% to .25% of the methyl cellulose to the cement content of the mix.

The second ingredient in the additive herein claimed is a stearate, such as aluminum stearate, zinc stearate, barium stearate and other stearates of similar qualities. This material is used in the present additive to reduce absorption of water by the mortar or concrete mix or concrete after setting takes place in order to waterproof the same. A surprising advantage which results from the use of aluminum and other stearates in motor is that the brick itself appears more strongly to resist water absorption even in areas which are not in contact with the mortar. It is believed that the aluminum stearate actually penetrates the brick structure and thereby helps render the brick itself, as well as the mortar, highly resistant to water absorption.

The higher the proportion of aluminum stearate or the other stearates to the cement content of a mix, the greater is the resistance of the ultimate product to water absorption and conversely, the smaller the proportion of aluminum or the other stearates to the cement, the less resistant is the ultimate product to water absorption. It is conceivable that in certain cases there may be no desire whatsoever to increase the ability of the material to repel moisture and consequently aluminum stearate would not be used at all. The range is consequently from zero to .2% and the optimum is .05%. It is important to note that when this specification refers to optimum results, account is taken of the economic or cost factor as well as the actual behavior of the material under consideration. Elimination of the cost factor may result in different optimum concentrations or proportions but they would not constitute a practical solution to the problems involved.

A third ingredient of the additive preparation herein claimed is a surfactant or surface active agent, also known as an air entraining agent. Surfactants found most suitable for use in connection with the present formula are alkyl-aryl-sulfonates such as KB40 made by Warwick Chemical Company and Oronite D40 made by Oronite Chemical Co. Other surfactants will also be suitable for the purposes of this invention.

The proportion of surfactant to the cement content of the mix may range from .10% down to .015%. The optimum proportion for the surfactants above named is .025%. Reducing this proportion results in less air content, lower water retention but higher strength. Increasing this proportion results in more air, increased water retention but lower strength. It is important to note that when the surfactant is used in combination with methyl cellulose, only one tenth of the surfactant is used than would be required without the methyl cellulose.

Still another ingredient in the additive herein claimed is an inert filler such as limestone, dust, volcanic ash, chalk, silica and the like. The proportion of inert filler to the other ingredients in the formula is not very critical. For example, when the additive constitutes 2% of the cement content of the mix, the inert filler should come to about seven times the total of all of the other ingredients of the additive but this proportion may be reduced when the proportion of the additive to the cement is less than 2%. An illustration is the following:

| | Percent |
|---|---|
| Methyl cellulose | .150 |
| Aluminum stearate | .050 |
| Surfactant | .025 |
| Inert filler | 1.775 |
| | 2.000 |

An optimum formula for the additive herein claimed is as follows:

| | Percent |
|---|---|
| Methyl cellulose | 7.50 |
| Aluminum stearate | 2.50 |
| Surfactant | 1.25 |
| Inert filler | 88.75 |
| | 100.00 |

The range of proportions of the ingredients in this formula is as follows:

| | Percent |
|---|---|
| Methyl cellulose | 2.5 to 12.5 |
| Aluminum stearate | 0.0 to 10.0 |
| Surfactant | 0.75 to 1.75 |
| Inert filler | Balance |
| | 100.00 |

The foregoing figures are all based upon weight and this is also true of all of the other figures hereinafter set forth both in the specification and claims. Furthermore, the term "additive" as herein used, is intended to designate the formula herein claimed and a reference to the additive as being 2%, for example, indicates that the additive comes to 2% of the weight of the cement in the mix.

In preparing the additive herein claimed, it should be borne in mind that the ingredients are all in powder form. The inert material is first mixed with the aluminum stearate. Then the methyl cellulose is mixed in and finally the surfactant. There is a reason for this sequence. It would be undesirable to coat the methyl cellulose and the surfactant with the aluminum stearate since this would prevent the methyl cellulose and surfactant from dissolving quickly in the mortar mix. It would appear that the sequence of steps above set forth produces a plurality of particles having a core of inert material coated with aluminum stearate, and a layer of methyl cellulose covering the aluminum stearate and a final layer of surfactant covering the methyl cellulose. Consequently, the outer layers of surfactant and methyl cellulose are free to dissolve quickly without hindrance by the aluminum stearate.

As has above been stated, an important object of this invention is the provision of a mortar having good workability. The workability of a mortar determines to a large extent the quality of the workmanship and the economy of bricklaying. If the mortar does not have good workability, the mason will have difficulty making a good tight joint and he will lay fewer bricks. It follows that the better the workability of a mortar, the better suited is it for the purposes for which it is made and used, apart from other factors which will hereinafter be discussed.

Workability is a property which is difficult to measure in the laboratory. The only available test is with the flow table. This, however, is an indication only of the consistency of the mortar and this factor alone is not controlling. The factors which contribute to workability are:

1. Consistency.
2. Adhesion.
3. Penatrability.
4. Weight.
5. Time of set.
6. Water retention.

*1. Consistency.*—In the flow table test the mortar is permitted to flow as the table is dropped or tilted under specified conditions. The flow of liquids is a measure of their consistency but solids are more complex. Portland cement, like many fine powders, exhibits colloidal properties, resulting in the formation of gels. These gels decrease flow but they increase workability and it is therefore evident that the flow test alone is not a measure of workability. The following table indicates the results of flow table tests applied to conventional lime mortar, masonry cement and several mortar mixes made in accordance with the present invention.

TABLE I

*Consistency—flow table tests*

| Mix | Additive, percent | Flow, percent |
|---|---|---|
| 1:6 | 2.0 | 105 |
| 1:5 | 1.5 | 104 |
| 1:4 | 1.5 | 98 |
| 1:3 | 1.5 | 86 |
| 1:3 (Masonry Cement) | | 110 |
| 1:1:6 (Lime Mortar) | | 112 |

*2. Adhesion.*—A mortar must be adhesive in order to be workable. If it is granular or is unable to adhere to itself or to the trowel or to the brick, the mason will have difficulty working with it. Increasing the adhesiveness, however, decreases the flow and if flow were the only test of workability, increased adhesiveness would be a most undesirable factor. Tests have been conducted to measure the adhesion tension of conventional lime mortar and masonry cement and the improved mortar herein claimed. This was done by determining the force necessary to withdraw a 1 inch diameter wire ring from the surface of the mortar in the same manner as the ring method for determining surface tension. The results are shown in the following table:

TABLE 2

Adhesion tension

[Grams of force required to lift a 1-inch ring from the surface of the material.]

| Mix | Additive, percent | Flow, percent | Adhesion Tension, grams |
|---|---|---|---|
| 1:6 | 2.0 | 100 | 4.7 |
| 1:1:6 (Lime Mortar) | | 109 | 3.2 |
| 1:3 (Masonry Cement) | | 108 | 4.0 |

3. *Penetrability.*—The reference here is to the trowel penetrating the mortar, as when the mason dips or digs his trowel into the mortar in his pan to obtain a working quantity of the mortar. If the trowel penetrates the mortar readily, it will spread more easily and it will be considered a workable mortar. To measure this property, the Vicat apparatus was used modified as follows: The shaft was replaced with a hollow tube of the same dimensions and the needle was replaced by a cylinder ¾ of an inch in diameter and 1¾ of an inch in length. The total weight of the shaft and cylinder was adjusted to 175 grams. The penetration was then determined in the same manner as the normal consistency determination. The mortars were made up to a flow of 100% to 115%. The greater the penetration, the greater the penetrability and consequently the greater the workability. The results of these tests are shown in the following table:

TABLE 3

Penetrability

| Mix | Additive, percent | Penetration (mm. 30 secs.) |
|---|---|---|
| 1:6 | 2.0 | 28 |
| 1:5 | 1.5 | 28 |
| 1:4 | 1.5 | 28 |
| 1:3 | 1.5 | 27 |
| 1:3 (Masonry Cement) | | 14 |
| 1:1:6 (Lime Mortar) | | 15 |

4. *Weight.*—The mortar must be lifted from the mason's pan to the work, that is, to the bricks being laid. The amount of mortar required in connection with each brick is not large but during the course of a normal day's brick laying operation by a single brick layer the quantity mounts up to considerable proportions and the relative weight of the material will accordingly affect the amount of work done. For example, in the construction of an 8 inch thick wall with a ½ inch joint and standard 2½ x 3¾ inch x 8 inch brick, a minimum of 15 cubic feet of mortar will be used for each 1000 bricks laid, without allowance for waste. The following table indicates the weight of mortar made in accordance with the several mixes therein set forth which would be required for each thousand bricks laid:

TABLE 4

Weight of mortars

| Mix | Additive, percent | Weight per cubic foot, pounds | Weight per 1,000 brick, pounds |
|---|---|---|---|
| 1:6 | 2.0 | 106 | 1,590 |
| 1:5 | 1.5 | 112 | 1,680 |
| 1:4 | 1.5 | 115 | 1,715 |
| 1:3 | 1.5 | 117 | 1,755 |
| 1:3 (Masonry Cement) | | 120 | 1,800 |
| 1:1:6 (Lime Mortar) | | 130 | 1,950 |

5. *Time of set.*—The cement in mortar begins to set as soon as the mixing is stopped. A mortar that sets too quickly becomes unworkable and the mason will have to retemper it. Thus the slower the set, the longer will the mortar remain workable. To determine the time of set, the following test was run: Vicat apparatus was used and the test was run in the same manner as the A. S. T. M. "Time of Set of Mortars" except that the 1 cm. plunger was used. The time of set thus determined is a measure of the limit of workability. The following table gives the results of this test:

TABLE 5

Time of set of mortars

| Mix | Additive, percent | Flow, percent | Temp., °F. | Humidity, percent | Time of Set, minutes |
|---|---|---|---|---|---|
| 1:6 | 2.0 | 105 | 85 | 62 | 150 |
| 1:6 | 2.0 | 105 | 70 | 100 | 220 |
| 1:6 | 2.0 | 105 | 50 | 75 | 240 |
| 1:3 (Masonry Cement) | | 110 | 70 | 100 | 60 |
| 1:1:6 (Lime Mortar) | | 112 | 70 | 100 | 105 |

6. *Water Retention.*—A mortar that has a low water retention will stiffen rapidly as the brick absorbs the water from the mortar. The mason will then have difficulty spreading the mortar on the brick. The following table gives the water retention properties of the several mortars therein listed.

TABLE 6

Water retention

| Mix | Additive, percent | Water Retention, percent |
|---|---|---|
| 1:6 | 2.0 | 82 |
| 1:5 | 1.5 | 79 |
| 1:4 | 1.5 | 81 |
| 1:3 | 1.5 | 87 |
| 1:1:6 (Lime Mortar) | | 77 |
| 1:3 (Masonry Cement) | | 60–88 |

Another important object of this invention is the provision of a mortar and light-weight concrete which possesses great dimensional stability.

Cracks in mortar, the breaking of the bond with the brick and even the cracking or disintegration of the brick or masonry unit can occur if the mortar undergoes excessive changes in volume. These changes result from four causes:

1. Setting.
2. Moisture.
3. Thermal changes.
4. Chemical reactions.

*1. Setting.*—While the mortar is in a plastic state it shrinks as it sets. In the tests whose results are set forth in the following table the setting shrinkage was determined by molding the mortar in 2 inch x 4 inch brass molds with glass plates on top and bottom. Measurements were taken after twenty-four hours and at various intervals to twenty-eight days. All of the perceptible shrinkage took place in twenty-four hours and if the specimens were kept in a moist cabinet at constant temperature no further change in volume would take place.

TABLE 7

Setting

[Linear changes of masonry mortars]

| Mix | Additive, percent | Shrinkage, percent |
|---|---|---|
| 1:1:6 (Pressure Hydrated Lime) | | 1.17 |
| 1:3 (Masonry Cement) | | 1.18 |
| 1:6 | 2.0 | 0.62 |
| 1:5 | 1.5 | 0.40 |
| 1:4 | 1.5 | 0.39 |
| 1:3 | 1.5 | 0.29 |

2. *Moisture.*—When mortar is wet it expands and when it dries it shrinks. The usual test procedure for progressive shrinkage involves exposure to air and the usual test for progressive expansion involves exposure to moisture. It was found that this procedure is unnecessary since the ultimate expansion or contraction would be the same as would be obtained by simply saturating or drying the specimens. The results of these tests are shown in the following table.

TABLE 8

*Moisture (Drying)*

[Linear changes of masonry mortars]

| Mix | Additive, percent | Shrinkage, percent |
|---|---|---|
| 1:1:6 (Pressure Hydrated Lime) | | .03 |
| 1:3 (Masonry Cement) | | .03 |
| 1:6 | 2.0 | .04 |
| 1:5 | 1.5 | .04 |
| 1:4 | 1.5 | .04 |
| 1:3 | 1.5 | |

3. *Thermal changes.*—Like other materials, mortars expand with increasing temperature and shrink with decreasing temperature. In this series of tests 1 inch x 1 inch x 11 inch bars were prepared with reference points and measure in the same manner as for the autoclave expansion test. They were kept at 0° F., measured and then at 70° F. measured again and the thermal expansion calculated therefrom. The results are shown in the following table.

TABLE 9

*Thermal changes*

[Linear changes of masonry mortars.]

| Mix | Additive, percent | Inches per inch per 1.0° F. | Percent per 100° F. |
|---|---|---|---|
| 1:1:6 (Pressure Hydrated Lime) | | 8.0×10⁻⁶ | .080 |
| 1:3 (Masonry Cement) | | 8.0×10⁻⁶ | .080 |
| 1:6 | 2.0 | 6.0×10⁻⁶ | .060 |
| 1:5 | 1.5 | 6.3×10⁻⁶ | .063 |
| 1:4 | 1.5 | 6.5×10⁻⁶ | .065 |
| 1:3 | 1.5 | | |

4. *Chemical reactions.*—(a) Limes are made by calcining calcareous rock and then hydrating the calcined rock. In the calcining, calcium oxide and magnesium oxide are formed. When water is added, the calcium oxide hydrates rapidly but the magnesia hydrates slowly, although pressure hydrating speeds this up. It has been shown that the magnesia on hydrating in a mortar causes a destructive expansion. This effect was measured by autoclaving 1 inch x 1 inch x 10 inch mortar bars and the results of the tests are shown in the following table:

TABLE 10

*Chemical effects*

[Linear changes of masonry mortars.]

| Mix | Additive, percent | Autoclave Expansion, percent |
|---|---|---|
| 1:1:6 (Pressure Hydrated Lime) | | .08 |
| 1:3 (Masonry Cement) | | .04 |
| 1:6 | 2.0 | .06 |
| 1:5 | 1.5 | .06 |
| 1:4 | 1.5 | .05 |
| 1:3 | 1.5 | |

(b) Water can cause destructive expansion. It can enter crevices between the brick and the mortar resulting from poor bond and on freezing expand. Or it can enter the pores of the mortar causing disintegration. Two series of tests were run to determine this property. The first was a water repellancy test consisting of immersing 2 inch cubes in ¼ inch of water for one hour and for twenty-four hours. The results are shown in the following table.

TABLE 11

*Water repellancy and absorption*

| Mix | Additive, percent | Absorption 1 hr. | Absorption 24 hr. | Ratio, 1 hr: 24 hr. |
|---|---|---|---|---|
| 1:6 | 2.0 | 2.1 | 5.1 | .41 |
| 1:5 | 1.5 | 1.5 | 3.3 | .45 |
| 1:4 | 1.5 | 1.3 | 2.8 | .46 |
| 1:3 | 1.5 | 1.2 | 2.7 | .44 |
| 1:1:6 (Lime) | | 4.6 | 11.8 | .39 |
| 1:3 (Masonry) | | 3.3 | 8.6 | .38 |

The second series of tests which were run to determine the destructive expansion resulting from absorption of water involved freezing and thawing cycles consisting of subjecting 1 inch x 1 inch x 10 inch mortar bars to freezing in air at 0° F., thawing in water at 40° F. and measuring the expansion. The results are shown in the following table and they are also plotted in Fig. 1.

TABLE 12

*Effect of freezing and thawing—1 inch x 1 inch x 10 inch mortar bars—percent expansion*

| Mix | Additive, percent | 10 | 15 | 20 | 25 | 35 | 50 | 75 | 100 |
|---|---|---|---|---|---|---|---|---|---|
| 1:1:6 (Lime) | | .002 | .011 | .018 | .024 | .046 | .096 | Disintegrated | |
| 1:3 (Masonry Cement) | | .001 | .001 | .001 | .002 | .003 | .005 | .005 | .005 |
| 1:6 | 2.0 | 0 | 0 | 0 | .001 | .002 | .002 | .002 | .002 |
| 1:5 | 1.5 | .001 | .001 | .002 | .002 | .003 | .003 | .003 | .003 |

(c) Efflorescence can also cause destructive expansion. Soluble salts crystallize in pores and cracks, resulting in spalling and cracking.

Efflorescence is an indication of either poor workmanship or an unsatisfactory mortar or a combination of both. It is caused by rain entering the mortar joint and dissolving a portion of the mortar or the salts in the brick and then depositing them on the brick surface.

Two types of efflorescence can occur, temporary and permanent. The first type (temporary) is not important since it is of short duration. It is caused by the dissolution of soluble salts in the mortar or brick, for example, sodium sulfate, calcium sulfate, magnesium sulfate and sodium chloride. Rain washes off this kind of efflorescence in a short time.

The second type (permanent) of efflorescence is more serious. It consists principally of calcium carbonate. It is caused by water entering the joint and dissolving the lime in the mortar and when the dissolved lime reacts with carbon dioxide in the air, insoluble calcium carbonate is formed and deposited. In addition to the unsightly appearance that this causes, it can have a destructive effect, since the crystallization pressure is capable of causing excessive expansion in masonry units. A small controlled amount of efflorescence may be beneficial. The deposit of small quantities of calcium carbonate in openings not in excess of several thousandths of an inch can serve to seal these openings. If the mortar joint is water-tight, efflorescence can be eliminated or greatly reduced. The following table indicates the relative development of efflorescence in the several mixes therein set forth.

TABLE 13

*Efflorescence*

[Brick wall 6 months old.]

| Mix | Additive, percent | Efflorescence |
|---|---|---|
| 1:1:6 (Lime Cement) | | heavy. |
| 1:3 (Masonry Cement) | | moderate. |
| 1:6 | 2.0 | slight. |

Still another important object of this invention is the provision of a mortar and light-weight concrete which has good water retention, provides a good bond and possesses a low permeability factor.

These three properties are discussed together because they are closely interrelated. A mortar that has a low water retention will result in a poor bond with the brick. A poor bond will result in excessive permeability. These factors are also closely related to the problem of efflorescence, above discussed, since a permeable wall will effloresce excessively.

1. *Water retention.*—This is one of the most important properties of a masonry mortar. It determines the quality of the work and the economy of the masonry. Brick and other masonry units tends to absorb water from the mortar by capillary action at a rate depending upon the porosity of the unit. Water retention is a measure of the ability of the mortar to resist this loss of water.

As above indicated, a low water retention mortar will result in a poor bond with a brick, increase permeability of the wall and excessive efflorescence. Moreover, a low water retention mortar will stiffen rapidly as it is applied to the brick, especially high absorption brick. Consequently, the bricklayer will have difficulty troweling the mortar and he will have to tool it more frequently. As a result, fewer bricks will be laid. To counter-act or compensate for a low water retention mortar, the use of hard low absorption brick is necessary but such brick is considerably more expensive than high absorption brick.

The water retention test for masonry cements is usually run with an Ottawa sand in the proportion of 1:3 by weight. Job proportions are by volume (as are all of the proportions in this specification) and the mortar sands which are conventionally used are entirely different from Ottawa sand so that the results are not always comparable. A series of water retention tests have been run with conventional mortar sands and the results of these tests are shown in the foregoing Table 6.

2. *Bond strength.*—The higher the absorption of the brick, the more difficult is it to effect a tight bond between the brick and the mortar. Furthermore, most common brick is made in sanded molds. This fine sand, which is loosely held, especially on the top flat surface of the brick, further reduces the strength of the bond. The bulk of the brick used in the New York Metropolitan area is the Hudson River common which is of this type. A series of tests have been run in which seven different Hudson River common brick were used, set together on the flat sanded surface. The method was the cross brick couplet except that the brick was used dry with no grout applied. The couplets were fourteen days old when tested. The results are shown in the following table.

TABLE 14

*Bond strength*

[Cross brick couplet—14 days.]

| Mix | Additive, percent | Bond Strength, p. s. i. |
|---|---|---|
| 1:1:6 (Lime Cement) | | 13 |
| 1:3 (Masonry Cement) | | 0 |
| 1:6 | 2.0 | 15 |

3. *Permeability.*—The factors which control permeability are:

a. Water retention.
    b. Shrinkage.
    c. Volume change.
    d. Workability.
    e. Absorption.

a. *Water retention.*—This factor has above been discussed and it will be understood that mortar with a low water retention will effect a poor bond with the brick and thus permit entry of water. The results of the water retention tests are shown in the foregoing Table 6.

b. *Shrinkage.*—This factor has also been above discussed. Mortars shrink on setting and if the shrinkage is excessive, the bond with the brick will be broken and water will be permitted to enter. The results of the shrinkage tests are shown in the foregoing Table 7.

c. *Volume change.*—This factor too has been above discussed. Excessive contraction or expansion due to temperature changes must necessarily result in a poor or broken bond. The results of temperature change tests are shown in the foregoing Table 9.

d. *Workability.*—This, too, has above been discussed. A mortar which does not have good workability cannot properly be spread upon the brick and consequently a poor joint will result.

e. *Absorption.*—This factor has also been discussed above and it will be understood that a mortar which has high absorption will allow enough water to enter to render the problem of efflorescence difficult. The results of the absorption tests are shown in the foregoing Table 11.

To test for permeability, brick boxes were constructed. These boxes had 8 inch walls, 18¼ inches high, 29 inches square, with ½ inch joints on a concrete base. After one month, the boxes were filled with water and the drop in water level measured. This was repeated after six months. The results of these tests are shown in the following Table 15.

TABLE 15

*Permeability of brick walls*

| | Lime Cement | Masonry Cement | Cement (2.0% Additive) |
|---|---|---|---|
| Mix | 1:1:6 | 1:3 | 1:6 |

DROP IN WATER LEVEL IN INCHES (Wall 1 Month Old)

| Time—hours: | | | |
|---|---|---|---|
| 1 | 5.0 | 8 | 4.00 |
| 3 | 7.5 | 12 | 5.00 |
| 5 | 8.5 | 14 | 6.25 |
| 7 | 9.5 | 15 | 7.50 |

(Wall 6 Months Old)

| | | | |
|---|---|---|---|
| 1 | 1.75 | 2.75 | 1.50 |
| 3 | 3.25 | 5.50 | 2.50 |
| 5 | 3.75 | 6.50 | 3.25 |
| 7 | 4.25 | 7.00 | 4.00 |

It has above been stated that brick walls with a high degree of permeability tend to produce efflorescence. This is indicated in the foregoing Table 13 which was based on the tests resulting in Table 15. Efflorescence on the brick boxes was very heavy in the case of 1:1:6 lime cement, moderate in the case of 1:3 masonry cement and very slight in the case of 1:6 mortar with 2.0% additive.

Still another important object of this invention is the provision of a mortar and light-weight concrete which possesses great structural strength. Reference is here made mainly to compressive strength and it will be understood that the importance of this factor increases with the height of the wall and with the weight to be borne. The measure of compressive strength obtained in the laboratory is usually determined with respect to a 2 inch cube. However, the mortar in a wall is usually only about ½ inch thick and the length and width of the brick. Tests have accordingly been run both with respect to two inch cubes and with respect to ½ inch layers corresponding in length and width to the dimensions of a brick. The latter tests were run by applying a ½ inch layer of mortar to a brick and setting another brick on top of said layer. The upper brick was then capped with neat cement and tested in compression. In most tests, the brick broke first so the results are only comparative. The following tables give the results of these several tests.

TABLE 16

Compressive strengths—p. s. i.—moist cured

[2 inch cubes.]

| Mix | Additive, percent | 1 | 3 | 7 | 28 | 90 |
|---|---|---|---|---|---|---|
| 1:6 | 2.0 | 205 | 447 | 773 | 1,168 | 1,463 |
| 1:5 | 1.5 | 338 | 737 | 1,200 | 1,875 | 2,257 |
| 1:4 | 1.5 | 456 | 1,254 | 1,879 | 3,000 | |
| 1:3 | 1.5 | 556 | 1,750 | 2,750 | 3,925 | |
| 1:3 (Masonry Cement) | | 118 | 450 | 675 | 1,000 | |
| 1:1:6 (Lime Mortar) | | 237 | 680 | 1,093 | 1,680 | |

TABLE 17

Compressive strengths—p. s. i.—brick with mortar

| Mix | Additive | Brick | Joint, inches | Brick with Mortar |
|---|---|---|---|---|
| 1:6 | | common | ⅜ | 1,133 |
| 1:6 | | do | ½ | 1,330 |
| 1:5 | | do | ½ | 1,918 |
| 1:5 | | do | ½ | 1,737 |
| 1:5 | | do | ⅜ | 1,557 |
| 1:5 | | face | ½ | 1,510 |
| 1:1:6 (Lime Mortar) | | common | ½ | 1,993 |
| 1:3 (Masonry Cement) | | face | ½ | 1,919 |

TABLE 18

Tensile strength—water cured

| Mix | Additive, percent | 7 Days | 28 Days |
|---|---|---|---|
| 1:6 | 2.0 | 150 | 170 |
| 1:5 | 1.5 | 225 | 263 |
| 1:1:6 (Lime Mortar) | | 160 | 200 |

TABLE 19

Effect of curing conditions

| Mix | Additive, percent | Compressive Strength (Percent of Moist Curing) | | | |
|---|---|---|---|---|---|
| | | (7 days) | | (28 days) | |
| | | Air | Water | Air | Water |
| 1:6 | 2.0 | 120 | 96 | 97 | 87 |
| 1:1:6 (Lime Mortar) | | 102 | 89 | 84 | 91 |
| 1:3 (Masonry Cement) | | 144 | 154 | 110 | 143 |

TABLE 20

Effect of time between mixing and placing mortar 1:6 (2.0% additive)

| Time after mixing, minutes | Penetration, 175 gms.—¾" Plunger, 30 sec. | Compressive Strength | |
|---|---|---|---|
| | | 7 Days | 28 Days |
| | Min. | | |
| 15 | 31 | 705 | 990 |
| 30 | 27 | 708 | 1,125 |
| 60 | 18 | 921 | 1,231 |
| 90 | 15 | 895 | 1,231 |
| 120 | 4 | | |
| 150 | 2 | | |

The principal compressive stress on a mortar is that due to the loads on the floor and the weight of the wall itself. An 8 inch wall with a ½ inch mortar joint will require about 1230 bricks and about 18.5 cubic feet of mortar for each 100 square feet. This will give a compressive stress of 74 p. s. i. for the 1:6 mortar (with additive) and 79 p. s. i. for the 1:1:6 mortar (lime) for each 100 feet of the height of the wall. Doubling this to allow for floor loads puts it considerably under the weakest mortar.

Fig. 2 is a plot of strength against mortar proportions using the additive at various ages.

Fig. 3 is a plot of strength against age for the various proportions using the additive.

I claim:

1. In combination with a lime-free mortar, an additive consisting of approximately 2.5% to 12.5% of a high viscosity grade of methyl cellulose of the order of 4,000 centipoises, up to approximately 10% of a water insoluble metal stearate, approximately .75% to 1.75% of surfactant, and the balance an inert filler, the total of said ingredients being 100%.

2. The combination of claim 1, wherein the surfactant is an alkyl-aryl-sulfonate.

3. The combination of claim 1, wherein the inert filler is powdered limestone.

4. The combination of claim 1, wherein the inert filler is powdered volcanic ash.

5. The combination of claim 1, wherein the inert filler is powdered chalk.

6. The combination of claim 1, wherein the inert filler is powdered silica.

7. In combination with a lime-free mortar, an additive in accordance with claim 1, wherein the metal stearate is aluminum stearate.

8. In combination with a lime-free mortar, an additive in accordance with claim 1, wherein the metal stearate is zinc stearate.

9. In combination a lime-free mortar, an additive in accordance with claim 1, wherein the metal stearate is barium stearate.

10. In combination with a lime-free mortar cement mix, the additive weighing approximately 2% of the cement content of said mix and comprising approximately .150% of methyl cellulose, approximately .050% of metal stearate, approximately .025% of surfactant and approximately 1.775% of inert filler, all of these percentages being by weight and related to the cement content of the cement mix, said methyl cellulose being of a high viscous grade of the order of 4,000 centipoises in a 2% solution, and said metal stearate being water insoluble.

11. An additive for a cement mix, consisting of approximately 2.5 to 12.5 parts of a high viscosity grade of methyl cellulose of the order of 4,000 centipoises in a 2% solution and approximately .75 to 1.75 parts of an air entraining agent, together with a water insoluble metal stearate, up to approximately 10 parts, and an inert filler to the extent necessary to bring the entire additive, including said inert filler, to 100 parts.

12. In combination with a lime-free mortar cement mix, an additive comprising a plurality of particles, each having an inert core, a metal stearate layer covering said core, a methyl cellulose layer covering said metal stearate layer, and a layer of surfactant covering said layer of methyl cellulose, said metal stearate constituting up to approximately 10% of the weight of the entire particle, the methyl cellulose constituting approximately 2.5% to 12.5% of the weight of the entire particle, and the surfactant constituting approximately .75% to 1.75% of the weight of the entire particle, said methyl cellulose being of a high viscous grade of the order of 4,000 centipoises in a 2% solution, and said metal stearate being water insoluble.

References Cited in the file of this patent

UNITED STATES PATENTS

| | | |
|---|---|---|
| 982,620 | Mas | Jan. 24, 1911 |
| 1,048,695 | Horn | Oct. 31, 1912 |
| 1,814,292 | Chittick | July 14, 1931 |
| 2,188,767 | Cannon et al. | Jan. 30, 1940 |
| 2,549,307 | Morgan et al. | Apr. 17, 1951 |
| 2,600,018 | Nelson et al. | June 10, 1952 |
| 2,655,004 | Wertz | Oct. 13, 1953 |

FOREIGN PATENTS

| | | |
|---|---|---|
| 695,079 | Great Britain | Aug. 5, 1953 |